United States Patent [19]

Sala

[11] Patent Number: 5,574,946
[45] Date of Patent: Nov. 12, 1996

[54] DATA TRANSMISSION SYSTEM USING INDEPENDENT ADAPTATION PROCESSES ASSOCIATED WITH STORAGE UNIT TYPES FOR DIRECTLY CONVERTING OPERATING SYSTEM REQUESTS TO SCSI COMMANDS

[75] Inventor: Patrick Sala, Porcheville, France

[73] Assignee: Bull S.A., Paris La Defense, France

[21] Appl. No.: 607,271

[22] Filed: Feb. 20, 1996

Related U.S. Application Data

[63] Continuation of Ser. No. 76,588, Jun. 14, 1993, abandoned.

[30] Foreign Application Priority Data

Jun. 15, 1992 [FR] France ................... 92 07208

[51] Int. Cl.$^6$ ........................................... G06F 5/00
[52] U.S. Cl. .................. 395/825; 395/821; 395/883; 395/885; 395/376; 364/236.2; 364/238.3; 364/248.1; 364/256.5
[58] Field of Search ....................... 395/425, 650, 395/700, 800, 821, 883, 885, 825, 375; 371/40.1

[56] References Cited

U.S. PATENT DOCUMENTS

| | | | |
|---|---|---|---|
| 4,060,849 | 11/1977 | Bienvenu et al. | 364/200 |
| 4,965,801 | 10/1990 | DuLac | 371/40.1 |
| 5,257,391 | 10/1993 | DuLac et al. | 395/800 |
| 5,293,624 | 3/1994 | Andrade et al. | 395/425 |
| 5,307,491 | 4/1994 | Feriozi et al. | 395/700 |
| 5,421,014 | 5/1995 | Bucher | 395/650 |

FOREIGN PATENT DOCUMENTS

0481896  4/1992  European Pat. Off. .

OTHER PUBLICATIONS

Moren, Bill "Link Multibus II and SCSI devices with smart adapter", Jun. 25, 1987, pp. 77–82.
"Link Multibus II and SCSI Devices with Smart Adapter", Bill Moren, Electronic Design, vol. 35, No. 15, Jun. 25, 1987, Hasbrouck Heights, New Jersey, U.S.A., pp. 77–82.

*Primary Examiner*—Thomas C. Lee
*Assistant Examiner*—Le Thien Luu
*Attorney, Agent, or Firm*—Weingarten, Schurgin, Gagnebin & Hayes

[57] ABSTRACT

A data transmission system between a computer bus and a large number of data storage units connected to one another by a specific connection to which the system is physically connected, including a central microprocessor running an operating system; and frame transfer capability including a data storage memory located between the bus and the connection. The operating system is associated with at least one application and includes at least one input/output microprocessor connected to the memory and to the connection. The application includes an initialization process; several adaptation processes each associated with a storage unit to adapt the protocols used on the buses and connection; and a task management process authorizing the input/output microprocessor to transfer the commands and the data corresponding to them from the memory to the connection and vice versa, on a message of the adaptation process.

21 Claims, 9 Drawing Sheets

DATA TRANSMISSION SYSTEM USING INDEPENDENT ADAPTATION PROCESSES ASSOCIATED WITH STORAGE UNIT TYPES FOR DIRECTLY CONVERTING OPERATING SYSTEM REQUESTS TO SCSI COMMANDS

CROSS-REFERENCE TO RELATED APPLICATIONS

This is a continuation of application Ser. No. 08/076,588, filed Jun. 14, 1993, now abandoned.

FIELD OF THE INVENTION

This invention concerns a system for transmitting data between a computer bus and a mass memory. More specifically, it is applicable to a mass memory that has a large number of disk memories and/or magnetic tape drives, with these units connected to one another by a specific standardized connection to which the system is physically connected.

BACKGROUND OF THE INVENTION

The transmission connections used for the mass memories with disk memories or tape drives are SCSI-type connections, standardized both by ANSI (American National Standard Institute) and ISO (International Standards Organization). The physical support for transmitting the connection is composed of a bus supporting two types of memories, namely magnetic disk memories and magnetic tape drives. According to the standard, up to six peripheral units, whether they are disk memories or tape drives can be connected on the same SCSI-type bus.

Another characteristic of the SCSI standard is the following: when a peripheral unit has received execution commands from the transmission system that consist either of entering data on the magnetic recording supports that they contain or reading them, these units can be disconnected from the physical channel to which they are connected and can perform their work independently of any connection to the outside.

On an SCSI-type bus, the information messages are composed of a large number of frames, each composed of useful data framed in time by command characters and by what are commonly called status messages, placed at the head and tail of the frame, respectively.

Moreover, all of the functional constituent elements of a computer, whether they are processors, memories or even input/output controllers of peripherals are located on a series of cards with standard dimensions. The cards are connected to the same bus, generally parallel-type, for providing communication between the different processors and data transport between the cards, and for providing them with electric power.

One of the buses most commonly used is the MULTIBUS II (registered trademark of Intel), whose architecture is structured around a main parallel-type bus, commonly called a PSB (Parallel System Bus) standardized according to IEEE (Institute of Electrical and Electronic Engineers) Standard 1296.

As shown in FIG. 1, an exemplary prior art PSB computer bus is connected with two SCSI-type connections, symbolized by the two buses $BD_1$ and $BD_2$, by means of a gateway connection device, or a data transmission system, whose function is to adapt the data transmission conditions on the PSB to the transmission conditions on the two SCSI-connection buses $BD_1$, $BD_2$. The data transmission modes on the PSB and on the two buses $BD_1$ and $BD_2$ are totally different with regard to the data transmission flow, the transmission protocols used, the writing codes, the information, the format, and the command characters.

FIG. 1 shows two data transmission systems $MSP_1$ and $MSP_2$. $MSP_1$ is connected to both the PSB and to the two buses $BD_1$ and $BD_2$. The second data transmission system $MSP_2$ is connected only to the bus $BD_2$. In the exemplary embodiment shown in FIG. 1, six data storage units are connected to the bus $BD_1$, namely the five disk memory units $D_1$ to $D_5$ and a tape drive $T_6$. The bus $BD_2$ is connected to the five disk memories $D_7$ to $D_{11}$ and to tape drive $T_{12}$. Since the bus $BD_1$ is connected to only one data transmission system $MSP_1$, it has a terminating plug TER on the end next to the tape drive $T_6$. The PSB bus is connected to a computer.

The general physical structure of a data transmission system (or gateway connection device), shown in FIG. 2, is described in more detail, as are its various modes of embodiment and operation in two patent applications: No. 91 08908 filed on Jul. 15, 1991 by the applicant and entitled "UNIVERSAL DEVICE FOR COUPLING A COMPUTER BUS TO A CONTROLLER OF A GROUP OF PERIPHERALS," and No. 91 08907 filed on the same day by the same company entitled "OPERATING SYSTEM FOR UNIVERSAL DEVICE FOR COUPLING A COMPUTER BUS TO A SPECIFIC CONNECTION ON A NETWORK."

A data transmission system MSP is composed of two parts, namely a universal coupling device GPU (General Purpose Unit) and an adapter DEA.

The GPU device is connected to the PSB by a coprocessor MPC, such as a VL 82c389 manufactured by Intel, which communicates by message mode with the computer; this mode is defined in the above-mentioned IEEE standard 1296.

The DEA device is physically connected to the two buses $BD_1$ and $BD_2$, to which are connected the different storage units indicated in FIG. 1, respectively. All the disks $D_1$ to $D_5$ and the tape drive $D_6$ form the mass memory system $SCSI_1$, while the other disks $D_7$ to $D_{11}$ and the tape drive $D_{12}$ form the mass memory system $SCSI_2$.

The GPU device includes the following different basic constituent elements:

the MPC coprocessor already mentioned;

a CPU microprocessor, which in fact constitutes the central processing unit of the GPU device, equipped with an internal bus BI for transporting commands and instructions intended for the different storage units making up the systems $SCSI_1$ and $SCSI_2$, and an address bus BAD transporting the addresses for these different commands. This microprocessor is combined respectively with an erasable programmable memory EPROM, a read-write memory SRAM and an interrupt manager, namely MFP. All these elements, EPROM, SRAM and MFP are connected to the internal bus BI and the address bus BAD;

a dual-port video-RAM-type memory indicated by VRAM;

a direct memory access controller DMAC, connected to the bus $B_2$ connecting that controller to the VRAM memory and to the bus $B_3$ connecting it to the coprocessor MPC; and a bus $B_1$ which connects the VRAM memory to the adapter DEA, whose constituent elements will be described below.

In the exemplary embodiment described here, the CPU microprocessor is the 68020 type manufactured by Motorola. The internal bus BI is a non-multiplexed 32-bit bus, while the BAD bus is on 32 address bits.

The erasable read-only memory EPROM has, for example, a capacity of 128 or 256 KB, and it contains self-testing and GPU initialization programs.

The operating system of the CPU microprocessor designated by GPOS (English acronym for General Purpose Operating System) is contained in the static memory SRAM and is loaded upon initialization of the coupling device GPU. The capacity of this memory is 512 KB or 1 MB, for example. It is described in the above-mentioned application No. 91 08907.

FIG. 2 shows that the direct access controller DMAC connected in series between the VRAM memory and the MPC coprocessor, and between the latter and the bus BI of the microprocessor CPU.

A detailed description of the structure and operation of the controller DMAC is given in French patent application No. 91 15814, filed on Dec. 19, 1991, by the applicant company under the title "CONTROLLER FOR MULTIPLE TRANSFER OF DATA BETWEEN A LARGE NUMBER OF MEMORIES AND A COMPUTER BUS."

The operating system, here called GPOS, organizes the operation of the entire microprocessor and consequently supervises the transfer of the frames coming from the computer (or from one of the systems $SCSI_1$, $SCSI_2$) from the bus PSB to the VRAM memory and vice versa. The adaptation program for the protocols used between the computer and the coupling device via the bus PSB and the SCSI-type connection is contained, for example, in the memory SRAM.

The microprocessor CPU is thus the brains of the coupling device GPU: it initializes the transfer of data, adapts the protocols, runs its operating system and transfers the data between DEA and the computer and vice versa, while dialoguing with DEA, with which it exchanges commands and statuses, for example, in a way that will be described below.

A detailed description of the role and operation of the other elements of the coupling device is given in the three patent applications mentioned above.

The basic constituent elements of the operating system GPOS of the universal coupling device GPU are presented in FIG. 3. The operating system GPOS is composed of the central node NY which performs the basic system functions, surrounded by a large number of managers, each performing a specific function. These managers are the applications manager GA, the intercommunications server SA, the event manager GI, the starter ST, the command manager GC, the terminal access manager GAT and the interactive checker IOMX.

Around this operating system gravitate applications which are in fact associated with it, each of them communicating and dialoguing with the central node NY and all or some of the managers surrounding it. The applications are autonomous and independent of one another. In the data transmission system of the invention, there are two of these applications, and they are called $A_1$ and $A_2$.

In the example of embodiment of the invention described here, the application $A_1$ is for the mass memory system $SCSI_1$, while the application $A_2$ is for the mass memory system $SCSI_2$. The role of each application consists of, on one hand, performing the transfer of data in both directions between the memory VRAM and each of the disk memories and tape drives belonging to $SCSI_1$ and $SCSI_2$, where these data must be written or read and, on the other hand, transferring the write or read commands for those same data to those same disk memories and tape drives.

The basic elements of the operating system GPOS are the node NY, the applications manager GA and the intercommunication server SA. The other managers will not be described further here. Their roles are described more fully in the above-mentioned French patent application No. 91 08907.

The node NY basically runs the system by managing and organizing in real time the work of the two applications $A_1$ and $A_2$, when one and/or the other is running. It responds to the requests of the managers that surround it when they ask it for a service, but takes no initiative. It also activates the processes of which each of the applications $A_1$ and $A_2$ is composed. The manager GA monitors and defines the status in which one or both of the applications $A_1$, $A_2$ is found. There are five of these statuses called $E_0$ to $E_5$. Status $E_0$ means that the service offered by the application is not available. Status $E_1$ is the status whereby the application is run and, in particular, it is the one where the initialization operations for all the processes constituting the application and all the corresponding tables are performed. Status $E_2$ is the most frequent and is the one in which the application is in the process of running. Status $E_3$ is the status where the application is in the process of terminating or even in the process of aborting. Status $E_5$ is the status for which the application is interrupted for a fault or an error. Greater detail on each of these statuses is given in the above-mentioned French application No. 91 08907.

The intercommunication server for applications SA allows each of them to communicate with another when necessary. Because each of the applications is autonomous and independent compared to the others, they can communicate with one another only through this server SA.

The different elements GPOS communicate with one another and with $A_1$ and $A_2$ by monitor calls symbolized by the arrows $FA_i$ (between NY and $A_1$–$A_2$), $FG_1$–$FG_2$ (between NY and GA-SA) $F_1$–$F_2$ (between GA and $A_1$–$A_2$) $FS_1$–$FS_2$ (between SA and $A_1$–$A_2$). These calls are described more fully in French application No. 91 08907.

This invention defines the role and function of one of the applications $A_1$, $A_2$ as part of the data transmission system to which they belong through their association with an operating system GPOS.

SUMMARY OF THE INVENTION

According to the present invention, a data transmission system between a computer bus and a mass memory, having a large number of data storage units connected to one another by a specific connection to which the system is physically connected, includes:

a central microprocessor connected to at least one memory containing an operating system designed to be executed by it;

means of transferring frames from the computer bus to the connection and vice versa, whose work is organized and managed by the microprocessor, including a data storage memory located between the bus and the connection; and is characterized by the fact that it includes at least one slave input/output microprocessor of the central processor connected, on one hand, to said memory and, on the other, to said connection.

The application includes:

an initialization process for the entire application;

a large number of distinct, separate adaptation processes, each of which is associated with a certain type of storage unit; and at least one task management process.

The different processes communicate with one another by message semaphore. Each of the adaptation processes converts and adapts commands coming from the computer intended for the corresponding storage unit into commands that comply with the protocol used on the specific connection. The management process authorizes the input/output microprocessor to transfer physically the commands and the data on the frames corresponding to them from the memory to the connection and vice versa, as soon as the corresponding adaptation process has finished said adaptation.

BRIEF DESCRIPTION OF THE DRAWINGS

A more complete understanding of the present invention and attendent advantages and features thereof will be more readily understood when by reference to the following detailed description when considered in conjunction with the accompanying drawings wherein.

DETAILED DESCRIPTION OF THE INVENTION

Figure 1:
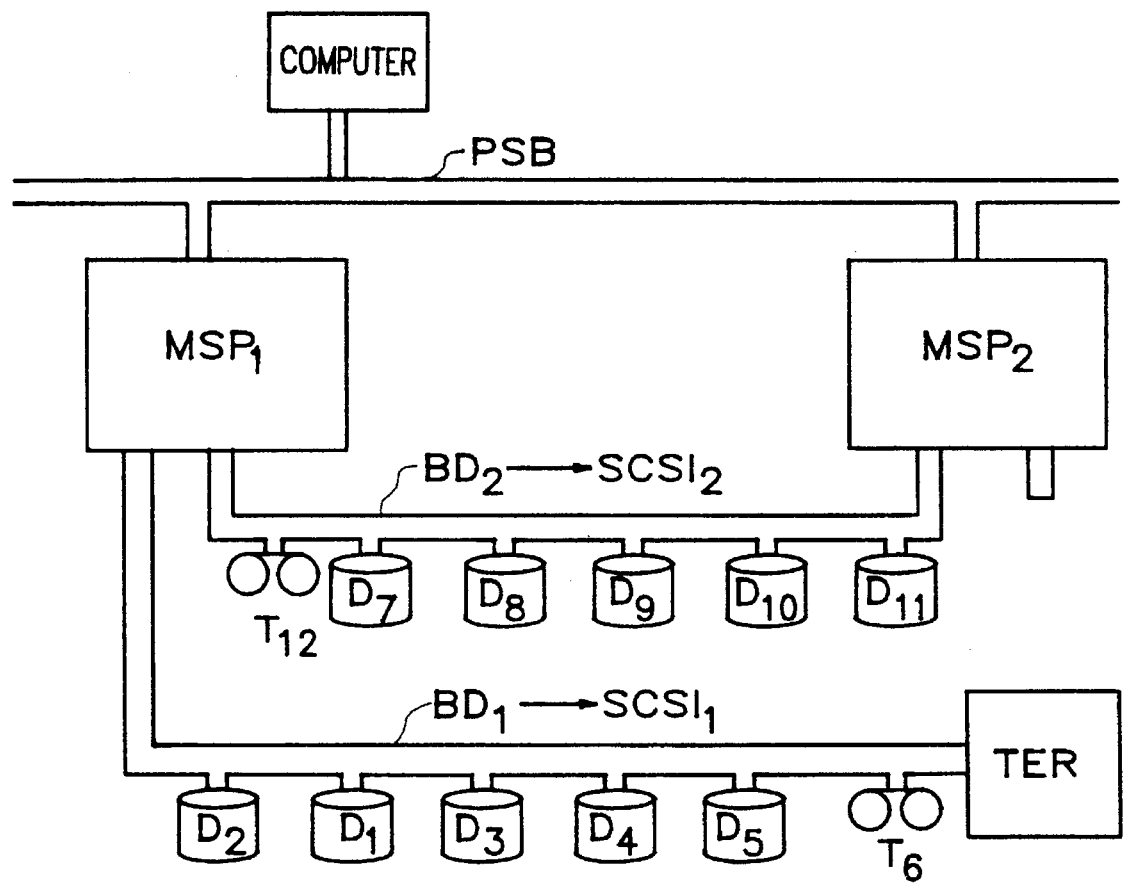
FIG. 1 shows how a computer is connected to different disk memories and tape drives are connected to the SCSI-type connection through the data transmission system of the invention.
Figure 2:
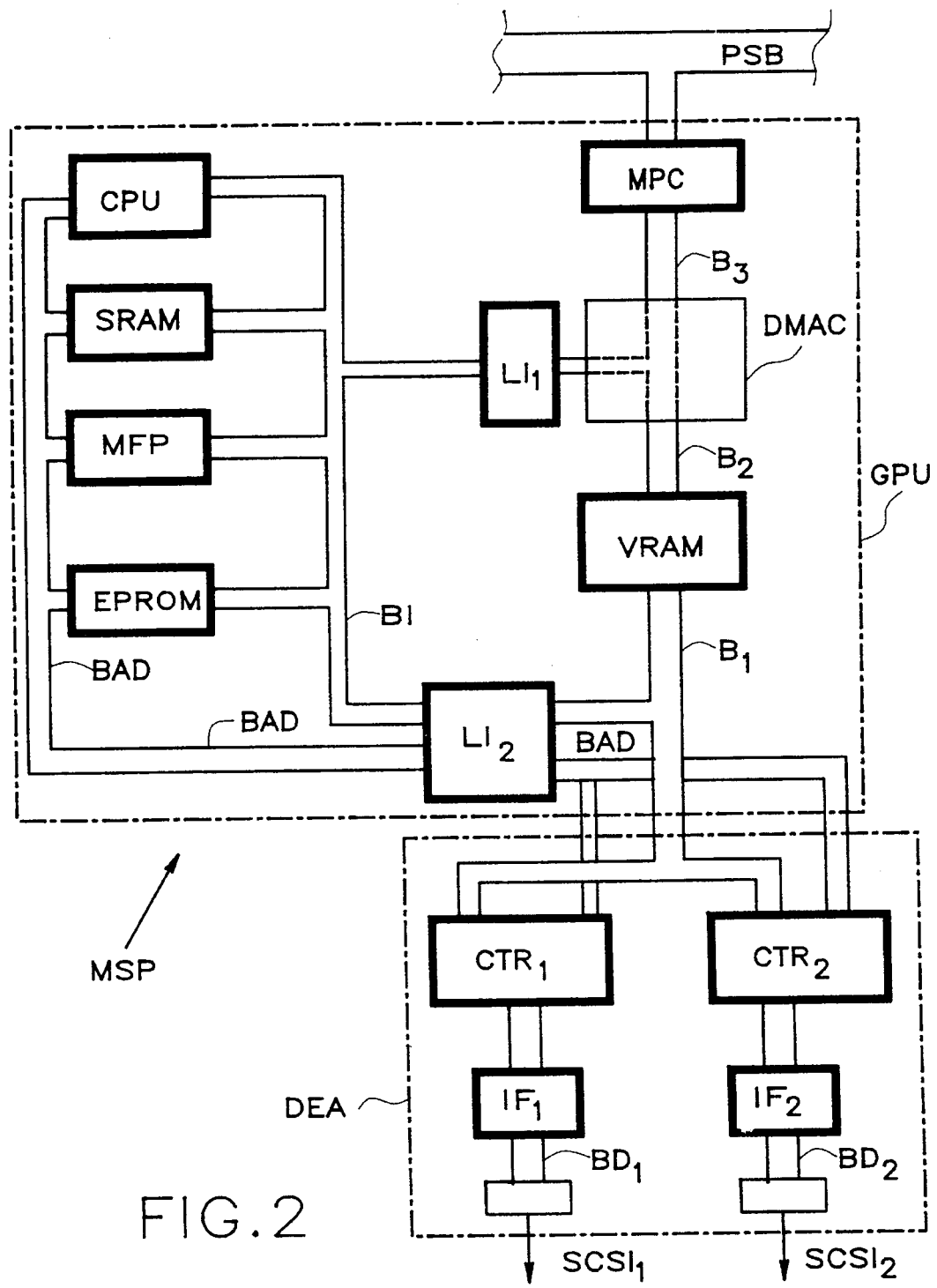
FIG. 2 shows different structural elements of a data transmission system between a computer bus and a network, like SCSI for example, whose universal coupling device is described in the French patent application No. 91 08908.

Refer to FIG. 2 and the adapter DEA which is located between the universal coupling device GPU and the two buses $BD_1$ and $BD_2$. The adapter device DEA includes a first and a second input/output microprocessor, namely $CTR_1$ and $CTR_2$ that can also be considered SCSI bus controllers. Each of these input/output microprocessors is connected, on one hand, to the data bus $B_1$ and, on the other hand, to the address bus BAD. Moreover, each of these two microprocessors is physically connected respectively to $BD_1$ and $BD_2$ through the interfaces $IF_1$ and $IF_2$, whose role is to adapt the level of the electrical signals supplied by the microprocessors $CTR_1$ and $CTR_2$ to the level of the electrical signals used on the buses $BD_1$ and $BD_2$, as defined by the SCSI standard. The two physical interfaces $IF_1$ and $IF_2$ serve to regenerate the signals coming either from $CTR_1$ and $CTR_2$, or from $BD_1$ and $BD_2$ before transmitting them to the first two or to the second two.

In the exemplary embodiment described here, the two input/output microprocessors are NCR53C700-type microprocessors manufactured by NCR. They execute a code of their own called SCRIPT code. This code is a specific input/output program written in a language, SCRIPT, designed by NCR for input/output management that complies with the SCSI standard. This code is written in the SRAM memory, upon initialization of the $MSP_1$ ($MSP_2$) system and is then rewritten in VRAM memory by GPOS (which then considers this code necessary data) as many times as there are data storage units (disk memories or tape drives) associated with the buses $BD_1$ and $BD_2$. The SCRIPT code is actually made up of a series of commands understood only by $CTR_1$ and $CTR_2$ that allow any set storage unit to send commands to be executed and corresponding data. The physical transfer of these commands and data is carried out, in accordance with the SCSI protocol, by $CTR_1$ and $CTR_2$. $CTR_1$ and $CTR_2$ are actually slaves of the central microprocessor CPU, when it uses $A_1$ and $A_2$. As soon as one of these two applications gives them the order to work, they then execute their task autonomously. Their function is then to go find the commands and data which are located in the video-RAM memory and send them to the disk memory units or tape drives connected to one of the two buses $B_1$ and $B_2$ and vice versa.

Figure 3:
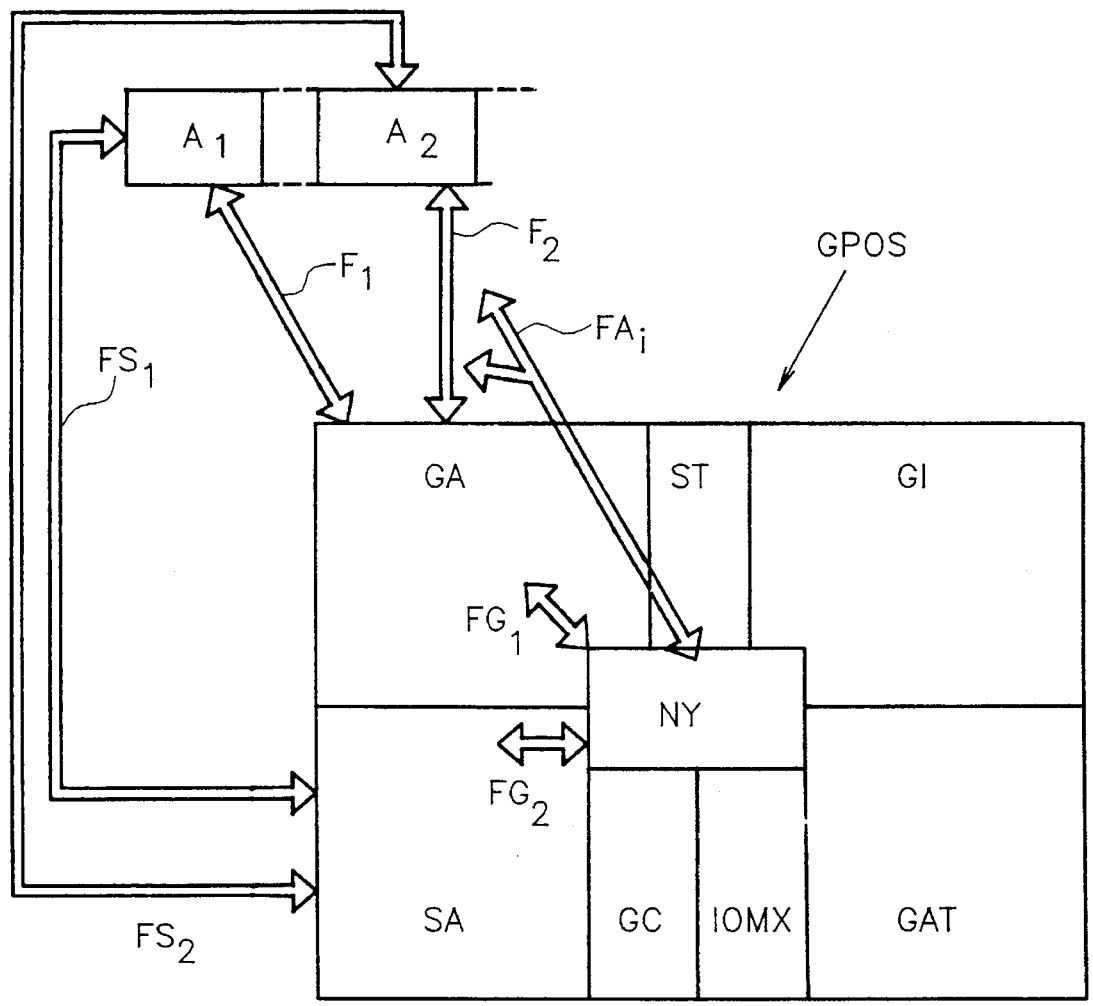
FIG. 3 illustrates the operating system of the data transmission system of the invention, as it is described in the above-mentioned application No. 91 08907.

Referring again to FIG. 3, each of the applications $A_1$ and $A_2$ is responsible for transmitting all of the commands in a program for executing commands that have to be carried out by each of the disk memory units or tape drives that are part of one of the two systems $SCSI_1$ and $SCSI_2$. A program for executing commands is designated by the acronym CP, (Channel Program). The channel program is composed of a header, followed by a large number of basic commands, which are designated by the acronym CCE (Channel Comment Entry). A CCE can mean that the data must be read in such or such a mass memory unit, or else some data must be written into it, while the sector of the memory where those data must be read or written is defined. In other words, a command execution or channel program CP is made up of all the commands CCE intended for a particular type of access to a given memory unit. Thus, if the application A1 (or A2) is associated with "n" data storage units (disk memories or drives), "m" possible accesses correspond to each of these units, with one channel program for each of these accesses. If a channel program is defined for a disk memory unit, for example, there will be "m" "channel programs," or m $CP_j$ where j=1,2,3,m. For each of these channel programs $CP_j$, there are "p" CCE commands.

Figure 4:
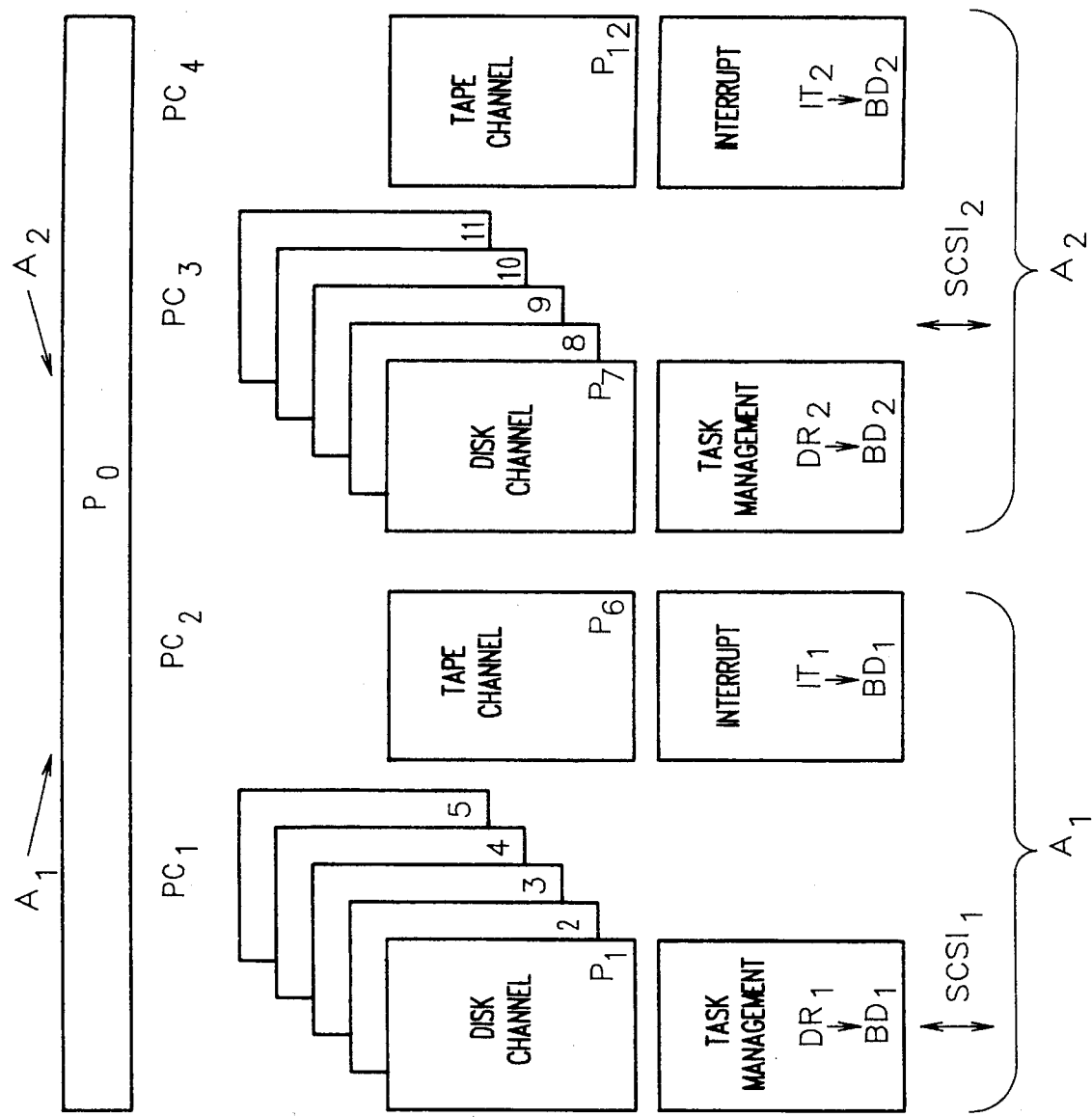
FIG. 4 shows the structure of an application used in the data transmission system of the invention.

FIG. 4 shows the internal structure of one or both applications $A_1$ and $A_2$. These two applications have a common initialization process, namely $P_0$. The first application $A_1$ deals with problems related to two virtual physical channels $PC_1$ and $PC_2$, while the application $A_2$ deals with the problems related to two other virtual physical channels $PC_3$ and $PC_4$. The channels $PC_1$ and $PC_2$ concern, respectively, the disk memories $D_1$ to $D_5$ and the tape drive $D_6$. The two channels $PC_3$ and $PC_4$ concern respectively the disk memories $D_7$ to $D_{11}$ and the tape drive $D_{12}$. The two channels $PC_1$ and $PC_2$ are those for the bus $BD_1$ associated with $SCSI_1$ while the two channels $PC_3$ and $PC_4$ are those of bus $BD_2$. The computer sees four different physical channels $PC_1$ to $PC_4$, while $MSP_1$ (or $MSP_2$) does not know of their existence and thinks that there are four virtual channels.

One or more processes, each associated with a certain data storage unit, either a disk memory or a tape drive, corresponds to the same virtual channel. Thus, channel $PC_1$ is associated with five processes, called logic channels, $P_1$ to $P_5$ associated respectively with disk memories $D_1$ to $D_5$. Channel $PC_2$ is associated with only one process or logic channel, namely $PC_6$, which is associated with the tape drive $T_6$. Similarly, channel $PC_3$ is associated with the five processes $P_7$ to $P_{11}$, which are themselves associated with disk memories $D_7$ to $D_{11}$, while channel $PC_4$ is associated with process $P_{12}$, which is itself associated with the tape drive $T_{12}$. It is clear that processes $P_1$ to $P_5$ and $P_6$ go with the application $A_1$, while processes $P_7$ to $P_{11}$ and $P_{12}$ go with application $A_2$. All the above processes are independent and autonomous from one another.

The application $A_1$, $A_2$ also includes a management process $DR_1$ for tasks which are performed by the disk memories and tape drives connected to the bus $BD_1$. It also includes an interrupt procedure $IT_1$, $IT_2$ designed to manage each of the interrupts issued by $CTR_1$, $CTR_2$ defined in specific places in its SCRIPT code. It can also be used as soon as an error in the execution of the SCSI protocol is detected by $CTR_1$, $CTR_2$, when the storage units connected to $BD_1$, $BD_2$ are processing commands sent to them by the data processing system of the invention. Similarly, the application $A_2$ includes the task management process $DR_2$, and the interrupt procedure $IT_2$, this process and this procedure deal with events that occur on the bus BD.

Figure 7:
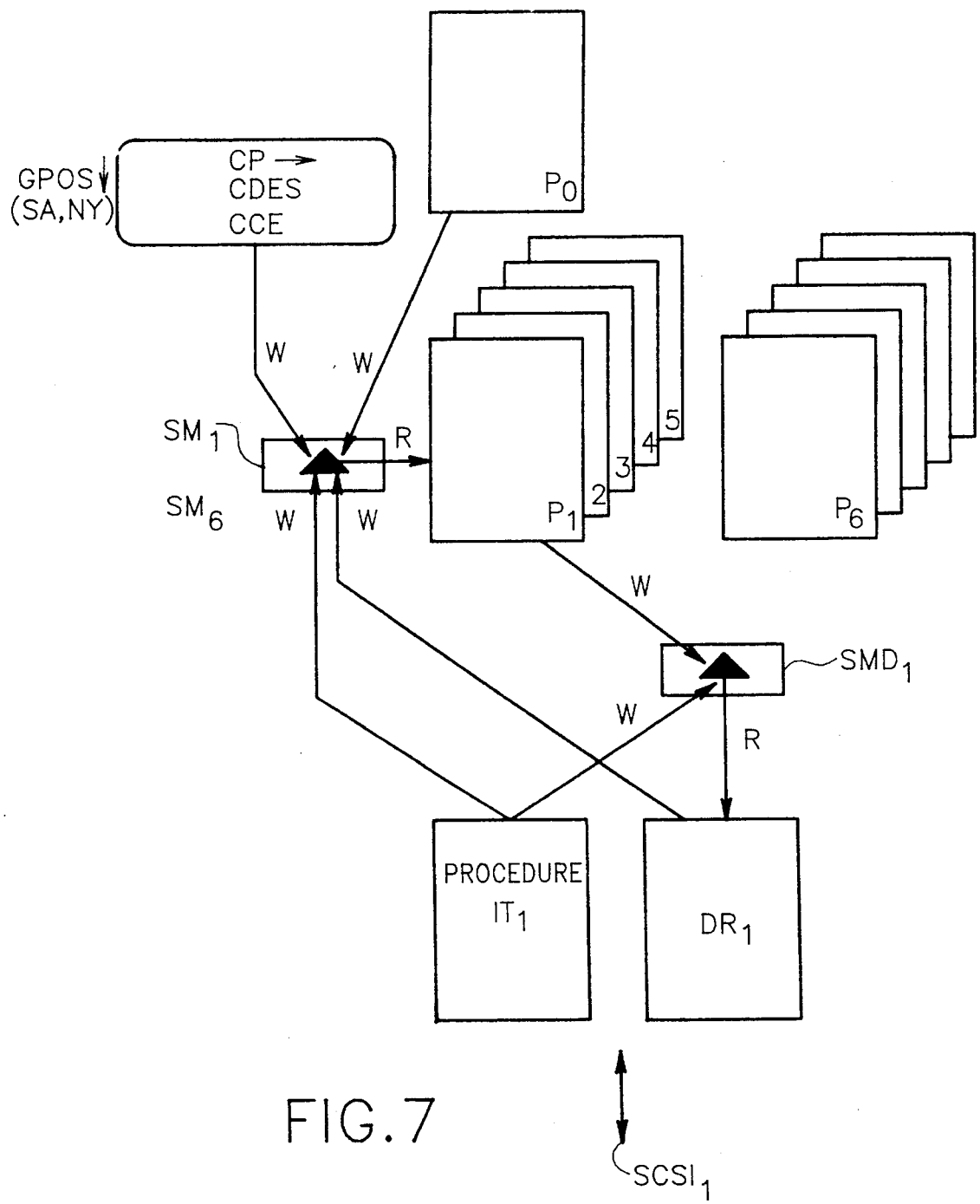
FIG. 7 shows how commands are exchanged between different processes that are part of an application of the data transmission system of the invention.

As can be seen better in FIG. 7, the operating system GPOS (through either its node NY or its server SA) sends a large number of channel programs CPj, each including a large number of commands CCE. For each program CPj, the commands are sent to the process which is supposed to process them (for example, one of the processes $P_1$ to $P_5$ or $P_6$) via one of the message semaphores $SM_1$ to $SM_6$ (each of them is associated with one process). These commands are also said to be posted in this semaphore. After having been posted in it, the process that is supposed to process them goes to find them, interprets them and converts them so that they comply with the SCSI standard. It can therefore be said that each of the processes $P_1$ to $P_6$ (the same would be true for the processes $P_7$ to $P_{12}$) converts the commands CCE which are sent to it by the operating system GPOS (and which therefore come from the computer) into commands that comply with the protocols written in the known SCSI language of each of the data storage units connected to the bus $BD_1$. This conversion is carried out in VRAM memory, which contains correspondence tables between CCE commands and SCSI commands.

Once these commands are converted into SCSI language by the process, it sends them to the manager $DR_1$ by posting them in a message semaphore associated with it, namely $SMD_1$. The manager $DR_1$ updates the SCRIPT code of the selected storage unit in VRAM memory. This is possible because the semaphore contains the identification number of the storage unit and the pointer of the corresponding SCRIPT table in VRAM (see below).

Figure 6:
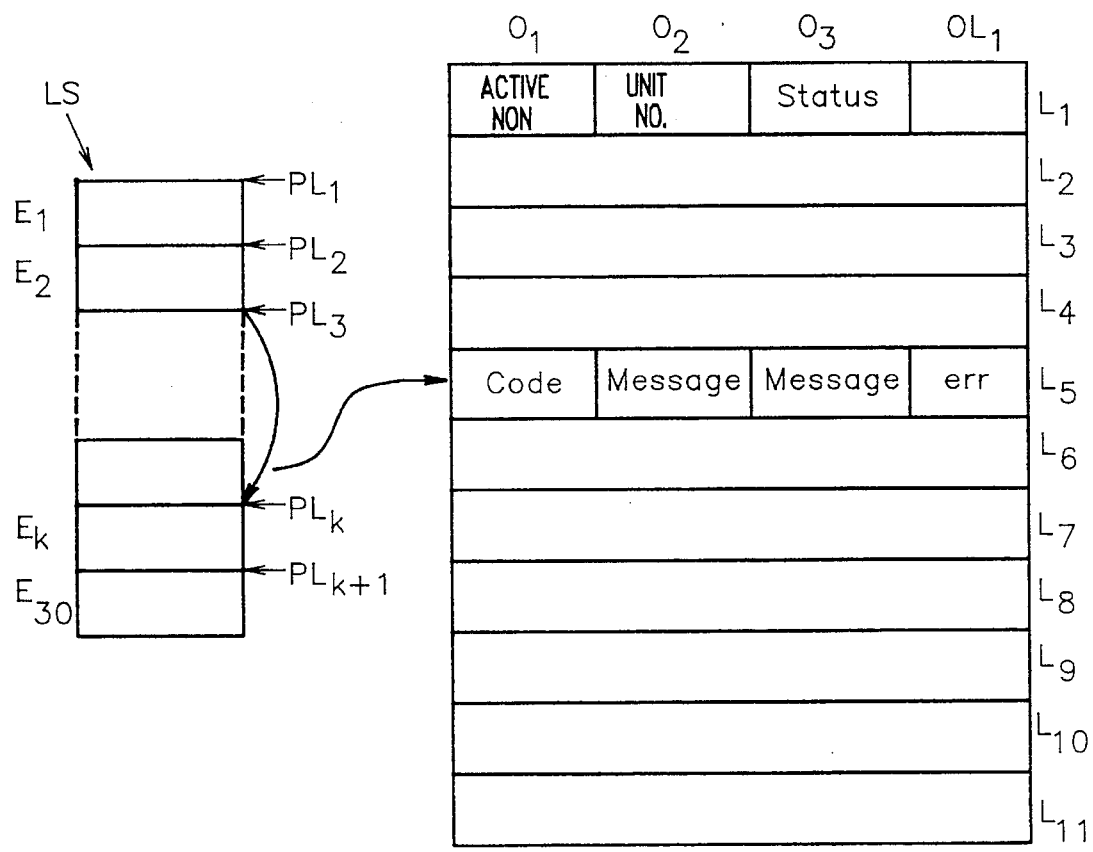
FIG. 6 shows how an element is structured that defines the different components for a command to be executed by one of the storage units of the SCSI network, an element read into the memory SRAM.

Now, we will refer to FIG. 6, on the left of which is a list LS that includes, in the example of embodiment described here, 30 elements $E_1$ to $E_{30}$, each defining a task executed by $CTR_1$, $CTR_2$ for the transmission of data and corresponding commands to or from a set storage unit. Before this task is executed, this element is empty. These 30 elements $E_1$ to $E_{30}$ are chained together. This list LS is located in the SRAM memory. At any time, this list includes free elements and active elements, which contain information for a precise task that must be executed by $CTR_1$, $CTR_2$.

There are many pointers with this list LS which make it possible to locate each of the elements on the list, whether they are free or active. For each free element on the list, there is therefore a starting pointer and an ending pointer, for example pointers $PL_1$ and $PL_2$ of the element $E_1$, which is assumed free in FIG. 6. Similarly, for any active element, there is a starting pointer and an ending pointer, for example, pointers $PL_2$ and $PL_3$ for element $E_2$, which is assumed to be active in FIG. 6. Similarly, the active element $E_k$ includes the pointers $PL_k$ and $PL_{k+1}$. All pointers for active elements are chained together. In addition, the list LS includes a pointer for the start of the active element at work, which means that the commands that are defined there are executed by $CTR_1$, $CTR_2$. Thus, for example, if the element $E_k$ is at work, the corresponding pointer defining the active element at work is pointer $PL_k$. Each element on the list includes 11 lines $L_1$ to $L_{11}$, with each line including four bytes $O_1, O_2, O_3, O_4$. This can be seen on the right part of FIG. 6.

The detailed composition of each of lines $L_1$ to $L_{11}$ are as follows.

Line $L_1$ gives the following information for each byte: $O_1$ indicates whether or not the element considered is active. Here, an inactive element corresponds to a byte with a value of zero, while an active element corresponds to a byte having the value 1. Byte $O_2$ indicates the address of the peripheral on the bus $BD_1$, $BD_2$. Besides the six peripherals that can be connected to the bus $BD_1$, the two task managers $DR_1$ and $DR_2$ can be connected. There are therefore eight possible addresses for a set SCSI-type bus. The byte $O_2$ will indicate an address between 2 and 7 (the addresses 0 and 1 are reserved for $DR_1$ and $DR_2$). Byte $O_3$ indicates the status of the SCSI command being executed by $CTR_1$ for the element considered. This command can be waiting, active, processed, run, terminated, aborted or in error. Byte $O_4$ is not used.

Line $L_2$ indicates the value of the pointer on the active element which immediately precedes the element at work (remember that all active elements are chained together).

Line$_3$ indicates the value of the pointer on the active element immediately following the one that is at work.

Line$_4$ defines certain information for each of its bytes $O_1$ to $O_4$. Byte $O_1$ indicates the code of the command (if it is a write, read, save command, etc.) Byte $O_2$ indicates whether it is a simple message, namely, to abort the command in progress or return to the initial status of the storage unit. Byte $O_3$ indicates whether it is an extended message. For example, it can be negotiating the transfer speed on the bus $BD_1$. Simple or extended messages in $O_2$ or $O_3$ are defined by the SCSI standard. Byte $O_4$ indicates whether an error has been detected by the corresponding task manager $DR_1$ or $DR_2$ (there are ten possible recorded errors in the example of embodiment described here).

Figure 5:
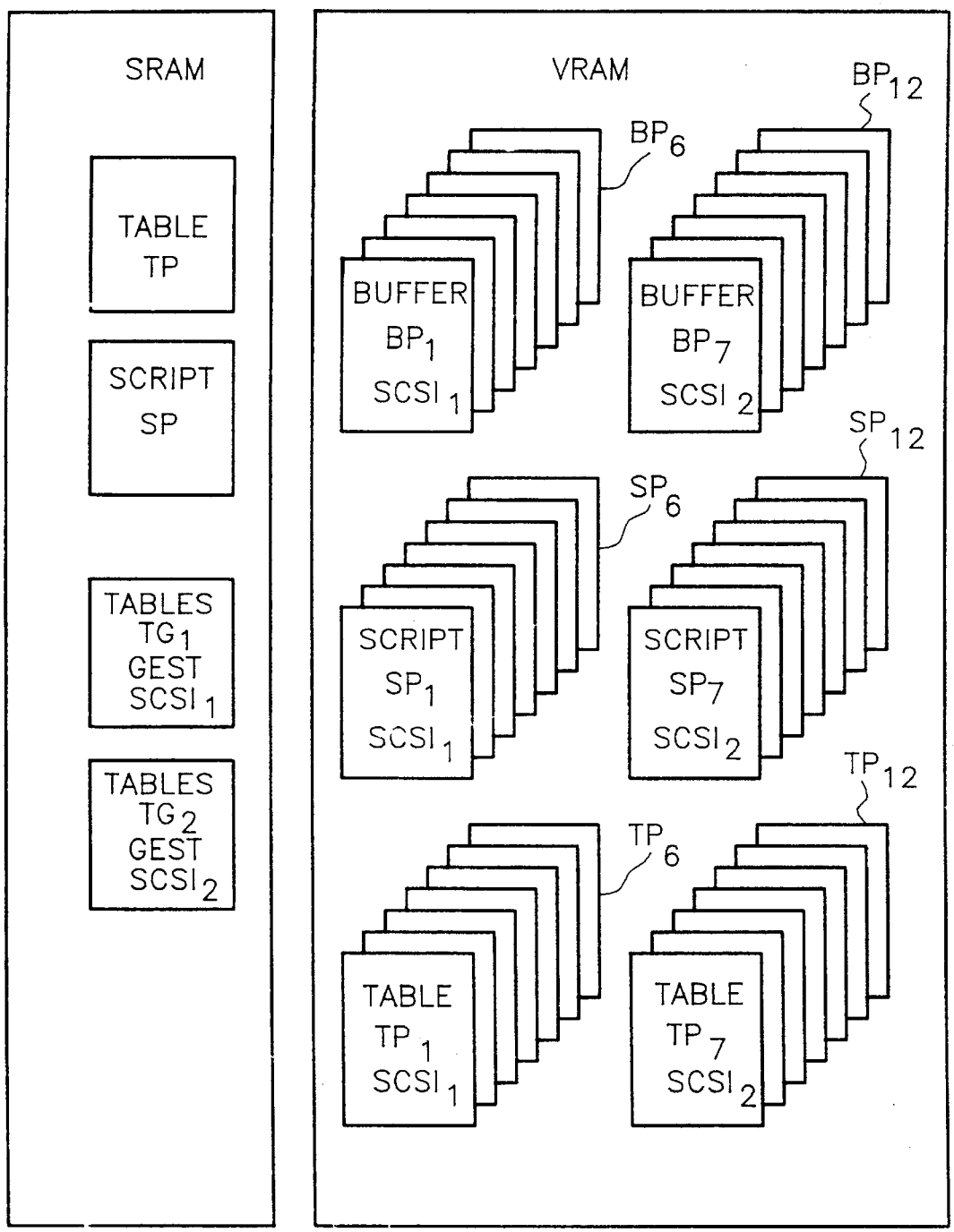
FIG. 5 shows how information and commands are distributed in the video-RAM and SRAM memories of the universal coupling device that is part of the data transmission system of the invention.

Line $L_5$ indicates the value of the pointer on the table for the data storage unit for which the command is intended; the table is in the SRAM memory (this table is defined in relation to FIG. 5).

Line $L_6$ indicates the value of the pointer in the table for the data storage unit at work; the table is in the VRAM memory (this table is defined in relation to FIG. 5).

Line $L_7$ indicates the value of the pointer on the command to be executed by the microprocessor $CTR_1$. This is the command that this microprocessor has to send to the storage unit and is defined in the VRAM memory. The process $P_1$ to $P_6$ associated with the storage unit has to execute the command that constructs this command and places it in VRAM memory.

Line $L_8$ indicates the address in the VRAM memory where the microprocessor $CTR_1$ must go search for its instructions to execute the SCRIPT code, allowing it to go search for the command and the corresponding data.

Line $L_9$ indicates the starting time for the command to be executed.

Line $L_{10}$ indicates the ending time for execution of the command, if it has been executed.

Line $L_{11}$ defines the last interrupts received for that command (interrupt made by the microprocessor $CTR_1$).

FIG. 5, shows the different data necessary for one of the applications $A_1$ or $A_2$ to run, as well as the way in which they are located either in VRAM or in SRAM. The VRAM memory includes a large number of memory zones, often designated by the name buffer where the data intended to be transferred to the storage units of the mass memory $SCSI_1$ or coming from it must be stored. Thus, buffers $BP_1$ to $BP_6$ correspond to the data storage units $D_1$ to $D_5$ and $T_6$. Similarly, buffers $BP_7$ and $BP_{12}$ correspond to the disk memories $D_7$ to $D_{11}$ and to the tape drive $T_{12}$.

The SCRIPT code for the controllers $CTR_1$ and $CTR_2$ is written into the VRAM memory as many times as there are data storage units. Thus, there are 12 VRAM memory zones reserved for this SCRIPT code. These memory zones are called $SP_1$ to $SP_{12}$, respectively. Zones $SP_1$ to $SP_6$ correspond to the mass memory SCSI1, while zones $SP_7$ to $SP_{12}$ correspond to the mass memory unit $SCSI_2$. Remember that the SCRIPT code is also written, only once, into the SRAM memory, in a special area of it called SP.

Each of the processes $P_1$ to $P_6$, on one hand, $P_7$ to $P_{12}$, on the other, corresponds to tables $TP_1$ to $TP_6$, $TP_7$ to $TP_{12}$, respectively. These tables include information that allows the task manager to work. This information includes, for example, the address of the buffer where the data to be transmitted, either to the computer or to the corresponding data storage unit, is stored. Thus, table $TP_1$ shows the address of the buffer $BP_1$ where the data intended for the disk memory $D_1$ is stored, when the disk memory has to work. This table $TP_1$ also includes the length of the information to be sent, as well as some parameters specific to certain commands.

The table for the data storage unit that is at work, which is assumed to be $TP_1$ here, for example, is recopied in the SRAM memory, in the table TP, as can be seen at the top left of FIG. 5. This recopying is done to allow $CTR_1$, $CTR_2$ to update during each input/output operation. Indeed, by construction, $CTR_1$, $CTR_2$ cannot access the SRAM memory. This table is also used to send special parameters by $CTR_1$ for specific commands that go with the SCSI protocol (for example, at the time of the initialization of the storage unit for $TP_1$). At the end of any input/output operation, the updated table is recopied into SRAM, which allows $P_1$ to have a log of the input/output operation. Indeed, it is important to prevent $P_1$ from going to search for it in VRAM, which would interrupt the work of $CTR_1$ and would disturb it. The CPU should avoid going to work in VRAM, because that slows down the transfer of data to $BD_1$. Moreover, tables $TG_1$ and $TG_2$ associated with the task managers $DR_1$ and $DR_2$, respectively, are written in the SRAM memory. These tables include the addresses of the different tables $TP_1$ to $TP_{12}$ for the different storage units at work.

FIGS. 5 to 8 explain the succession of operations that define the function of an application $A_1$ or $A_2$. Assume, for example, that information is to be written on a certain sector of a certain disk in the disk memory $D_1$. The process of the application $A_1$ that is going to be used is therefore process $P_1$, the task manager is $DR_1$, and the interrupt procedure $IT_1$. Note that each of the processes $P_1$ to $P_6$ corresponds to semaphores $SM_1$ to $SM_6$, respectively, and semaphore $SMD_1$ corresponds to the manager $DR_1$. Each of the processes $P_1$ to $P_6$ and $DR_1$ can go write (symbol W in FIG. 7) in the semaphores associated ($SM_1$ to $SM_6$ and $SMD_1$) with the others but can only read its own associated semaphore (symbol R in FIG. 7).

It is assumed that the card carrying all the elements of $MSP_1$ has been initialized, that the operating system GPOS is running, and that the application $A_1$ is also running. This means that the process $P_0$ has performed its initialization work and the application is in status $E_2$. It is also assumed that the bus $BD_1$ and all the data storage units have been initialized, particularly the disk memory $D_1$. So an attempt is made to execute a series of commands CCE in a channel program CP for writing a block of data in a certain sector of the disk memory $D_1$.

Figure 8A:
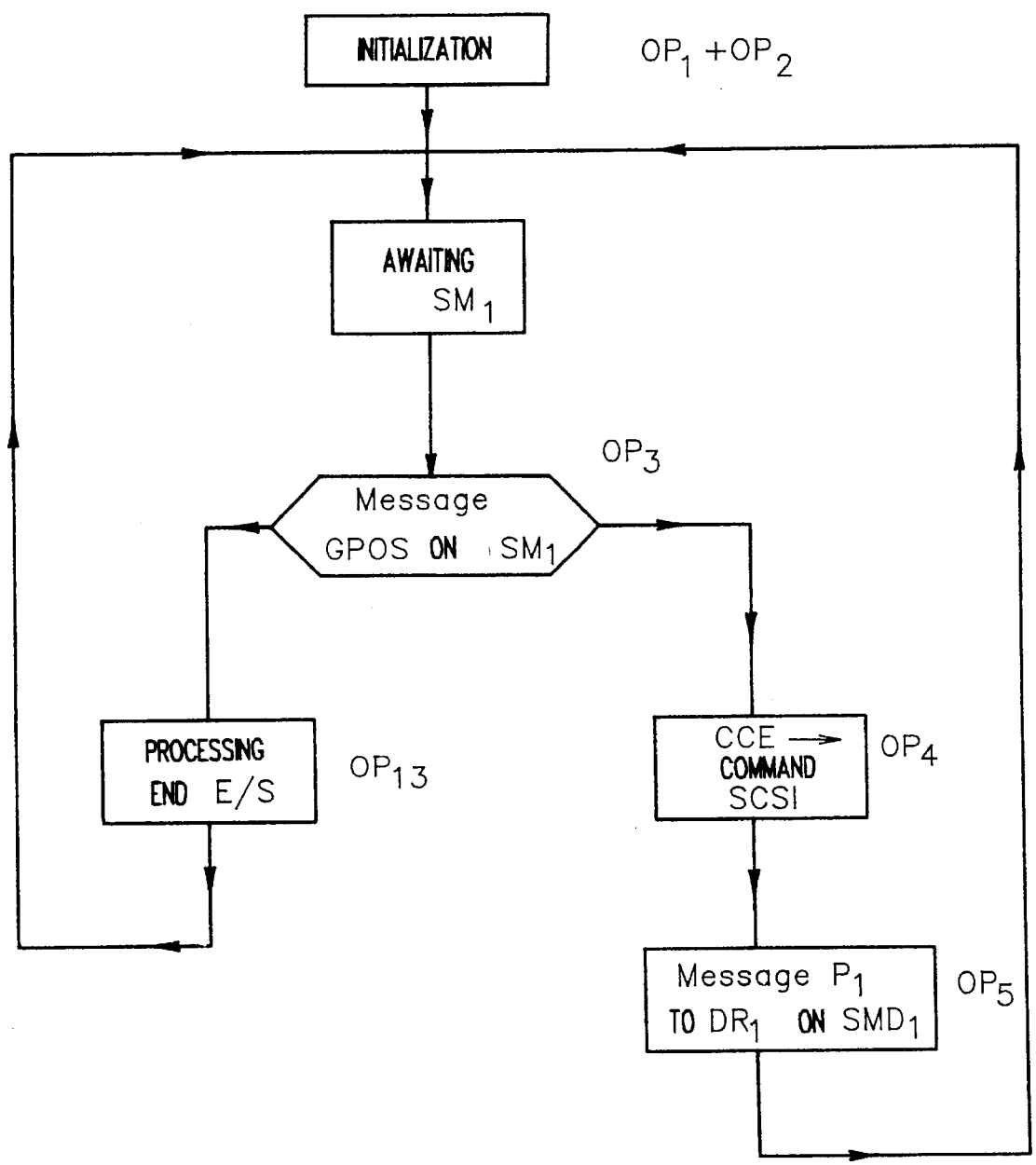
FIG. 8 (comprising FIGS. 8a and 8b) is a diagram of the main operations performed by an application that is part of the data transmission system of the invention.
Figure 8B:
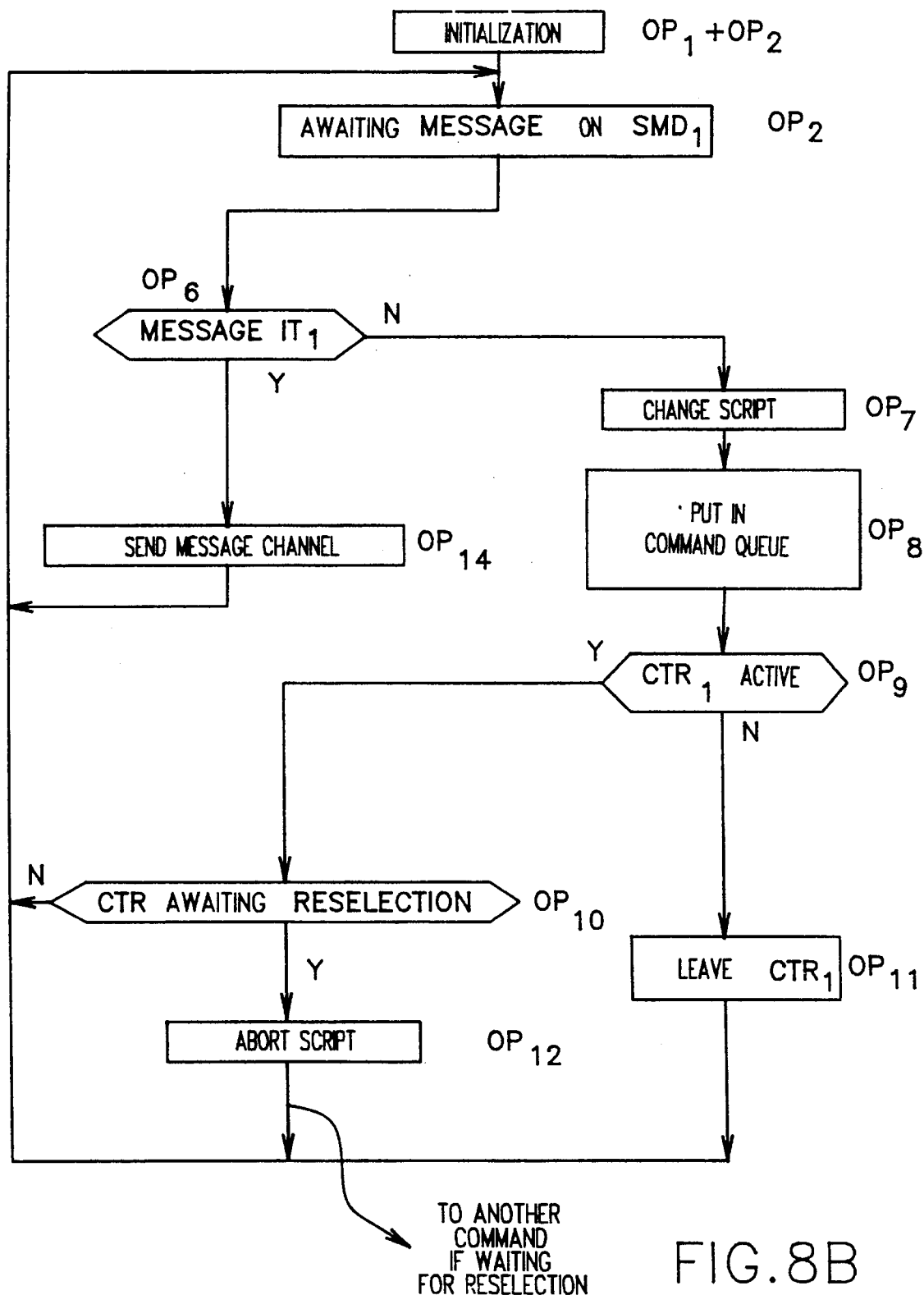

The succession of operations is then the following, with FIG. 8A related to the operations performed by $P_1$ and FIG. 8B related to those performed by $DR_1$.

Operation $OP_1$: Assume then that the process $P_0$ has initialized all the processes $P_1$ to $P_6$, as well as the task manager $DR_1$ and the interrupt procedure $IT_1$. Once that has been done, the process $P_1$ initializes all of its tables, including table $TP_1$. The task manager $DR_1$ initializes its table $TG_1$.

Operation $OP_2$: The process $P_1$ will see whether there is a data storage unit where it has been told to go work. $P_1$ will then see what type of unit it is. Once this has been done, it will reinitialize it. The process $P_1$ and the task manager $DR_1$ put themselves in the position "awaiting semaphore," $P_1$ on $SM_1$, $DR_1$ on semaphore $SMD_1$.

Assume then that the computer ORD has sent a channel program via the bus PSB to the operating system GPOS: in fact, the operating system GPOS is the one which, when an interrupt which is sent to it by the operating system of the computer ORD, will go look in the computer's central memory for the information needed to execute an input/output command. GPOS will then transfer the necessary data to the VRAM memory and write it into the buffer $BP_1$, while the channel program, equipped with all its CCE commands, will be written into the SRAM memory. Then it goes to Operation $OP_3$.

Operation $OP_3$: The operating system GPOS puts a message in the semaphore $SM_1$ as soon as it receives the header information from the channel program. This message is intended for $P_1$. Now it goes to $OP_4$.

Operation $OP_4$: Then it goes to find the necessary CCEs in the SRAM memory (GPOS told it where it must go to find these CCE commands in the SRAM memory when the message was posted in $SM_0$), in order to reconstruct, according to the SCSI standard, a group of commands that can be understood by the data storage unit $D_1$. At that time, $P_1$ thus converts the protocol used between ORD and GPOS for sending commands into an SCSI protocol. $P_1$ will then update the table $TP_1$ for that data storage unit in the VRAM memory, and write the address where the information should be written on the disk chosen for that purpose, as well as its length. It also updates the address of the data buffer in the VRAM memory where the data is temporarily stored before it is transferred to the disk memory $D_1$.

Operation $OP_5$: The process $P_1$ then puts a message in the semaphore $SMD_1$ into which it puts the number of the disk memory unit where it wants to make the data transfer and also the address in the VRAM memory where the command is found. Any process like $P_1$ sends to $DR_1$ and its associated storage unit only one command at a time, even if it needs to execute several commands for the same channel program CP. These commands are thus sent one after the other. The process $P_1$ also puts the address of the table $TP_1$ in the semaphore $SM_1$. $P_1$ is then in a waiting state for semaphore $SM_1$. GPOS hands over to $DR_1$ (FIG. 8B). Now it goes to $OP_6$.

Operation $OP_6$: At the end of this operation $OP_5$, $P_1$ checks whether an interrupt is received in the semaphore $SM_1$ from the interrupt procedure $IT_1$. If it is, it goes to operation $OP_{11}$ (see below) if it is not, it goes to operation $OP_7$.

Operation $OP_7$: During this time, the task manager $DR_1$ analyzes the message contained in $SMD_1$ and then updates the SCRIPT code of the data storage unit in question, namely here $D_1$ (buffer address, length). Indeed, the message posted in $SMD_1$ contains the pointer of table $TP_1$ in the SRAM memory. This makes it possible to obtain the pointer of the equivalent table in the VRAM memory and the pointer on the command to be executed. Now it goes to the next operation $OP_8$.

Operation $OP_8$: As soon as the previous update is done, the task manager $DR_1$ fills the corresponding element of LS containing the information on the command to be executed. As soon as that is done, the operation transferring the data contained in the VRAM memory to the disk memory $D_1$ can begin.

Operation $OP_9$: Then it makes sure that the controller $CTR_1$ is not doing anything. If that is true, it goes to operation $OP_{10}$; if not, it goes to operation $OP_{11}$.

Operation $OP_{11}$: The controller $CTR_1$ executes its SCRIPT code (in $SP_1$), which allows it to do its data transfer work, from the starting address of the SCRIPT code given by the task manager $DR_1$. The task manager then updates the pointer on the active element and puts the semaphore $SMD_1$ ($OP_2$) back in a waiting state, while the controller $CTR_1$ continues to run and to manage the different phases provided by the SCSI standard for transferring data on the bus $BD_1$ to the disk memory $D_1$. $CTR_1$ continues to run until it finds an interrupt instruction in the SCRIPT code in $SP_1$. At that time, the operating system GPOS directly connects the interrupt procedure $IT_1$ which manages the controller $CTR_1$. Then three cases are possible:

A) Simple Case

In this case, the controller $CTR_1$, with the bus $BD_1$ free, executes the command that it is asked to execute and generates an interrupt, signifying input/output end when its work is finished. This interrupt means that everything has been executed without error; the data contained in the buffer $BP_1$ have been transferred to disk and written there; the interrupt procedure that starts up is such that first the interrupt value is read in the controller $CTR_1$, i.e., its type; and the procedure, seeing it is an input/output end, updates the status in the active element on the list (byte $O_3$ of line $L_1$) and changes line $L_{11}$. In $L_1$, the field is set at 0 (byte $0_1$), and the active element pointer goes to 0. Then the interrupt procedure $IT_1$ sends a message to $P_1$ via $SM_1$ indicating that everything is finished and has gone well. At the same time, this same procedure $IT_1$ stops sending a message to GPOS via $SM_1$. In response to that message, $P_1$, seeing that it is not a message from GPOS, goes to operation $OP_{13}$.

Operation $OP_{13}$: $P_1$ sends the computer an input/output report and transfers the data to the computer with the support of GPOS. $P_1$ returns to "awaiting semaphore $SM_1$" ($OP_2$).

B) Complex Case

This case concerns the circumstances where the disk memory unit is voluntarily disconnected from the bus $BD_1$, to perform write or read operations that are requested of it. Remember that this procedure is defined by the SCSI standard. When the disk memory $D_1$ is disconnected, it sends an interrupt on the bus $BD_1$ which reactivates the interrupt procedure $IT_1$. The latter reads that there is a disconnection and then updates the active element (line $L_1$, changed status) and the starting address of the SCRIPT code. The interrupt sent by the disk memory $D_1$ means: "there is a disconnection of $D_1$." The procedure $IT_1$ then looks at the list LS to see whether there are any other commands to be executed by the controller $CTR_1$. If there are no commands to be executed, it sends the controller $CTR_1$ back to wait for reconnection. If the answer to the preceding question is yes, this means that there is another command to be executed for another process ($P_2$ to $P_6$), (this command is carried out by the interrupt procedure $IT_1$). The active element pointer is updated on a new command to be executed by the controller $CTR_1$: a new SCRIPT code address is taken and $CTR_1$ leaves to execute it, and $IT_1$ ends. If the disk memory $D_1$ is reconnected, $CTR_1$ resumes executing its code and it goes back to the start of Simple Case A.

There are also a third and a fourth case, which are called the intermediate and special cases, respectively.

C) Intermediate Case

This is the case where the controller $CTR_1$ is waiting for reselection by the disk memory $D_1$. In this case, assume that another command corresponding to another process $P_2$, for example, can be executed by the data storage unit for that process. The latter then performs the operations $OP_3$ to $OP_5$. For process $P_1$, this corresponds to operation $OP_{10}$, where the SCRIPT code, which is stopped on an instruction waiting to reconnect (internal instruction in SCRIPT code), is made to abort. $DR_1$ performs operations $OP_6$ to $OP_9$. Since $CTR_1$ is active, it goes to $OP_{10}$, where it checks whether it is "waiting for reselection". If the answer is yes (symbol Y), the SCRIPT code is aborted, and it goes to $OP_2$. If the answer is no (symbol N), it goes directly to $OP_2$. When the SCRIPT code is aborted ($OP_{10}$), the procedure $IT_1$ is reactivated, and the process $P_2$ performs the command requested of it (see end of complex case).

D) Special Case

The procedure $IT_1$ is reactivated by an incident detected by $CTR_1$. It then constructs a message for $DR_1$ containing a report of the incident, and ends by sending it. $DR_1$ is reactivated by this message and performs the operation $OP_6$, then $OP_{14}$.

Operation $OP_{14}$: $DR_1$ updates these tables and the list LS and sends a message to the process concerned ($P_1, P_2, \ldots$) and goes back to $OP_2$.

A variety of modification and variations are possible in light of the above teachings without departing from the scope and spirit of the invention, which is limited only by the following claims.

What is claimed is:

1. A data transmission system ($MSP_1$, $MSP_2$) between a computer parallel bus (PSB) and a mass memory ($SCSI_1$, $SCSI_2$) on a SCSI bus having a large number of data storage units ($D_1$ to $D_5$, $T_6$, $D_7$ to $D_{11}$, $T_{12}$) connected to one another by a specific connection ($BD_1$, $BD_2$) to which the system is physically connected, that includes a central microprocessor (CPU) connected to at least one memory (SRAM) containing an operating system (GPOS) designed to be executed by it comprising:

means of transferring frames (MPC, $B_2$, $B_3$, VRAM, $B_1$, DMAC, $CTR_1$, $CTR_2$) between the computer bus and the connection, whose work is organized and managed by the microprocessor, including a data storage memory (VRAM) located between the computer bus and the connection; the operating system (GPOS) being associated with at least one specific application ($A_1$, $A_2$) to transmit data between the computer bus (PSB) and said connection ($BD_1$, $BD_2$); said data transmission system including at least one input/output microprocessor ($CTR_1$, $CTR_2$) responsive to the central micro processor (CPU), connected to said data storage memory (VRAM) and to said connection; said at least one application including:

a process for initialization ($P_0$) of an entire application, a plurality of separate adaptation processes independent from one another ($P_1$ to $P_6$, $P_7$ to $P_{12}$), each of said adaptation processes associated with a certain type of storage unit, said processes directly converting commands sent via message semaphore from said GPOS into commands that comply with SCSI protocol, each said adaptation process communicating with one another by message semaphore to assist conversion, the conversion being carried out in the VRAM through correspondence tables located therein; and at least one management process authorizing the input/output microprocessor to transfer physically the commands and data in frames corresponding to them between the memory and the connection as soon as the corresponding adaptation process has finished said adaptation wherein the storage memory (VRAM) has second memory zones ($BP_1$ to $BP_{12}$), each assigned to storage of data intended for each of the different storage units, and tables ($TP_1$ to $T_{12}$) each associated with a certain one of them, including the address of the second memory zone associated with the same unit and the length of the necessary data stored there.

2. A data transmission system according to claim 1, wherein the plurality of adaptation processes ($P_1$ to $P_6$, $P_7$ to $P_{12}$) and the management process ($DR_1$, $DR_2$) are each associated with at least one message semaphore ($SM_1$ to $SM_6$, $SMD_1$), and each of those processes can read into its associated semaphore and write into the others.

3. A system according to claim 2, further including at least one interrupt procedure ($IT_1$, $IT_2$) configured to manage each of the interrupts generated by the input/output microprocessor ($CTR_1$, $CTR_2$) at specific places in its input/output program ($SP_1$ to $SP_{12}$).

4. A system according to claim 2, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

5. A system according to claim 2, wherein a data input/output program to or from the connection is associated with the input/output microprocessor, and is written, on one hand, into a special zone (SP) of the memory (SRAM) connected to the central processor, and, on the other hand, in said storage memory, as many times as there are adaptation processes, in initial memory zones reserves for that purpose ($SP_1$ to $SP_{12}$).

6. A system according to claim 5, wherein the storage memory (VRAM) has second memory zones ($BP_1$ to $BP_{12}$), each assigned to storage of data intended for each of the different storage units, and tables ($TP_1$ to $TP_{12}$) each associated with a certain one of them, including the address of the second memory zone associated with the same unit and the length of the necessary data stored there.

7. A system according to claim 6, wherein the contents of the table corresponding to the storage unit at work is recopied in a corresponding table (TP) in the memory (SRAM) associated with the central microprocessor (CPU).

8. A system according to claim 6, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

9. A system according to claim 5, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

10. A system according to claim 5, wherein the contents of the table corresponding to the storage unit at work is recopied in a corresponding table (TP) in the memory (SRAM) associated with the central microprocessor (CPU).

11. A system according to claim 10, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

12. A system according to claim 11, wherein the contents of the table corresponding to the storage unit at work is recopied in a corresponding table (TP) in the memory (SRAM) associated with the central microprocessor (CPU).

13. A system according to claim 11, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

14. A system according to claim 1, wherein a data input/output program to or from the connection is associated with the input/output microprocessor, and is written, on one hand, into a special zone (SP) of the memory (SRAM) connected to the central processor, and, on the other hand, in said storage memory, as many times as there are adaptation processes, in initial memory zones reserves for that purpose ($SP_1$ to $SP_{12}$).

15. A system according to claim 14, wherein the storage memory (VRAM) has second memory zones ($BP_1$ to $BP_{12}$), each assigned to storage of data intended for each of the different storage units, and tables ($TP_1$ to $TP_{12}$) each associated with a certain one of them, including the address of the second memory zone associated with the same unit and the length of the necessary data stored there.

16. A system according to claim 15, wherein the contents of the table corresponding to the storage unit at work is recopied in a corresponding table (TP) in the memory (SRAM) associated with the central microprocessor (CPU).

17. A system according to claim 15, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

18. A system according to claim 14, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

19. A system according to claim 1, wherein the storage memory (VRAM) has second memory zones ($BP_1$ to $BP_{12}$), each assigned to storage of data intended for each of the different storage units, and tables ($TP_1$ to $TP_{12}$) each associated with a certain one of them, including the address of the second memory zone associated with the same unit and the length of the necessary data stored there.

20. A system according to claim 19, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

21. A system according to claim 1, wherein the memory associated with the central microprocessor has a list (LS) including a plurality of elements ($E_1$ to $E_{30}$), each defining a task executed by the input/output microprocessor for the transmission of data and corresponding commands to or from a certain storage unit.

* * * * *